United States Patent
Kitamura

(10) Patent No.: US 9,609,161 B1
(45) Date of Patent: Mar. 28, 2017

(54) IMAGE READING APPARATUS AND IMAGE FORMING APPARATUS

(71) Applicant: FUJI XEROX CO., LTD., Tokyo (JP)

(72) Inventor: Tomoaki Kitamura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/067,411

(22) Filed: Mar. 11, 2016

(30) Foreign Application Priority Data

Sep. 16, 2015 (JP) ................................. 2015-182590

(51) Int. Cl.
*H04N 1/04* (2006.01)
*H04N 1/00* (2006.01)

(52) U.S. Cl.
CPC ..... *H04N 1/00909* (2013.01); *H04N 1/00519* (2013.01); *H04N 1/00795* (2013.01); *H04N 1/00885* (2013.01); *H04N 1/00981* (2013.01); *H04N 1/00994* (2013.01); *H04N 2201/0094* (2013.01)

(58) Field of Classification Search
CPC ........... H04N 1/00909; H04N 1/00519; H04N 1/00795; H04N 1/00885; H04N 1/00981; H04N 1/00994
See application file for complete search history.

(56) References Cited

U.S. PATENT DOCUMENTS 5,808,757 A * 9/1998 Ikeda ................. H04N 1/00795
353/103
5,860,042 A * 1/1999 Tomaru .............. H04N 1/00519
399/92

FOREIGN PATENT DOCUMENTS

JP 09-197750 A 7/1997
JP 10-243170 A 9/1998

* cited by examiner

*Primary Examiner* — David Gray
*Assistant Examiner* — Michael Harrison
(74) *Attorney, Agent, or Firm* — Sughrue Mion, PLLC

(57) ABSTRACT

An image reading apparatus includes a housing unit including a support table on which an original document is supported, a reading member disposed inside the housing unit to read the original document, a power source unit disposed adjacent to the housing unit while being separated by at least one wall, the power source unit accommodating a power circuit, and a sending member that sends air inside the power source unit into the housing unit through an opening formed in the wall.

3 Claims, 4 Drawing Sheets

IMAGE READING APPARATUS AND IMAGE FORMING APPARATUS

CROSS-REFERENCE TO RELATED APPLICATIONS

This application is based on and claims priority under 35 USC 119 from Japanese Patent Application No. 2015-182590 filed Sep. 16, 2015.

BACKGROUND

Technical Field

The present invention relates to image reading apparatuses and image forming apparatuses.

SUMMARY

An image reading apparatus according to an aspect includes a housing unit including a support table on which an original document is supported, a reading member disposed inside the housing unit to read the original document, a power source unit disposed adjacent to the housing unit while being separated by at least one wall, the power source unit accommodating a power circuit, and a sending member that sends air inside the power source unit into the housing unit through an opening formed in the wall.

BRIEF DESCRIPTION OF THE DRAWINGS

An exemplary embodiment of the present invention will be described in detail based on the following figures, wherein.

DETAILED DESCRIPTION

Figure 1:
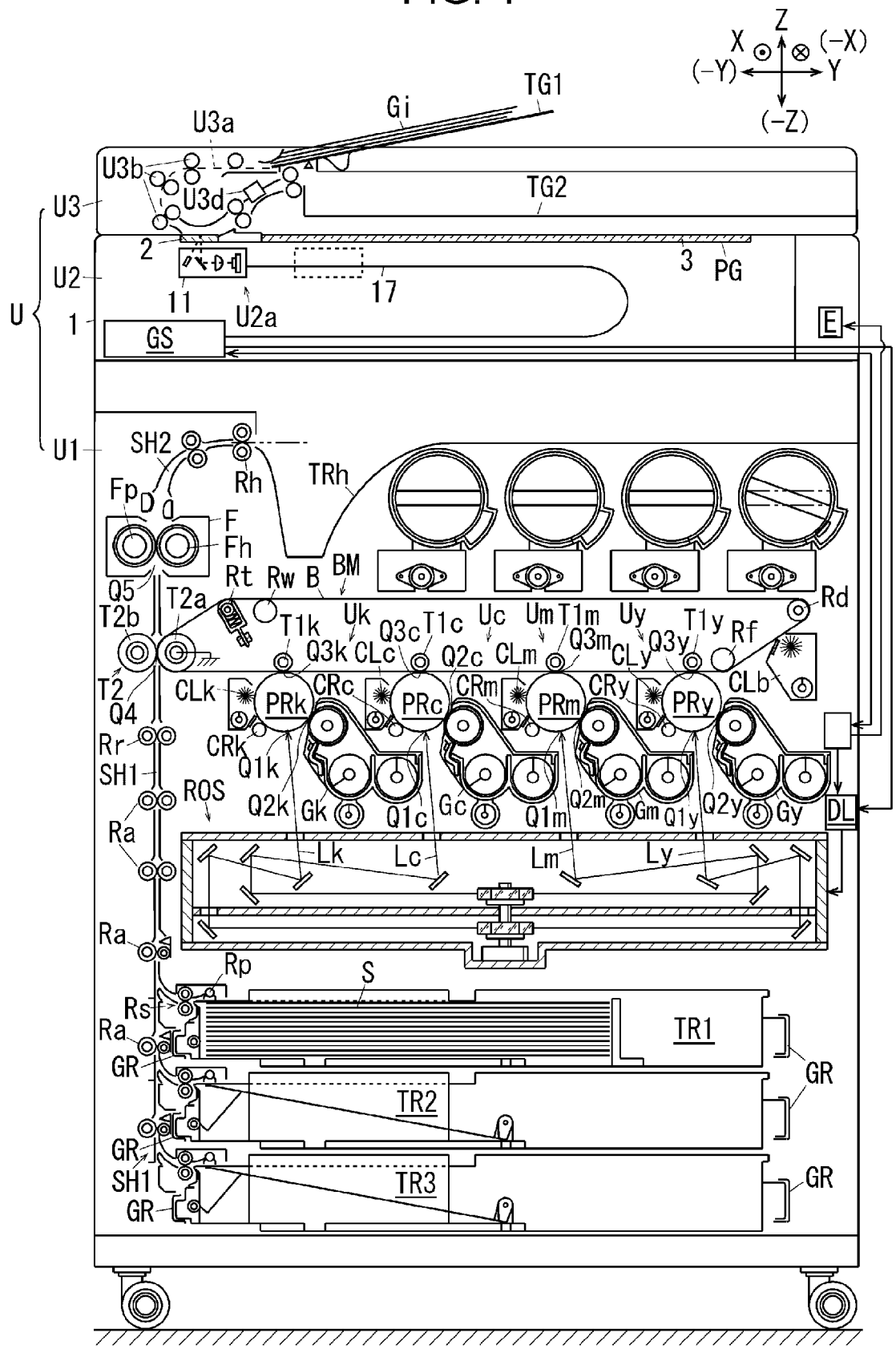
FIG. 1 is an overall view of an image forming apparatus according to a first exemplary embodiment.

Referring now to the drawings, a specific exemplary embodiment of the invention (hereinafter referred to as an exemplary embodiment) is described. The invention, however, is not limited to the exemplary embodiment described below.

For ease of understanding of the following description, throughout the drawings, the frontward and rearward directions are expressed as an X-axis direction, the leftward and rightward directions are expressed as a Y-axis direction, and the upward and downward directions are expressed as a Z-axis direction. Directions or sides denoted by arrows X, −X, Y, −Y, Z, and −Z respectively indicate the frontward, rearward, rightward, leftward, upward, and downward directions or the front side, the rear side, the right side, the left side, the upper side, and the lower side.

In each of the drawings, an encircled dot denotes an arrow directing from the rear to the front of the drawing and an encircled cross denotes an arrow directing from the front to the rear of the drawing.

In the following description using the drawings, components other than those necessary for the description are appropriately omitted for ease of understanding.

First Exemplary Embodiment

FIG. 1 is an overall view of an image forming apparatus according to a first exemplary embodiment.

In FIG. 1, a copying machine U, serving as an example of an image forming apparatus according to a first exemplary embodiment of the invention, is an example of a recording unit and includes a printer unit U1, which is an example of an image recording apparatus. A scanner unit U2, which is an example of a reading portion and serves an example of an image reading device, is supported on the printer unit U1. An auto-feeder U3, which is an example of an original-document transporting device, is supported on the scanner unit U2. A user interface, which is an example of an input unit, is supported by the scanner unit U2 according to the first exemplary embodiment. The copying machine U is operable in response to an input made by an operator through the user interface.

An original-document tray TG1, which is an example of a medium container, is disposed on the auto-feeder U3. The original-document tray TG1 is capable of holding a pile of multiple original documents Gi that are to be copied. An original-document output tray TG2, which is an example of an original-document ejection portion, is disposed below the original-document tray TG1. Original-document transport rollers U3*b* are disposed along an original-document transport path U3*a* between the original-document tray TG1 and the original-document output tray TG2.

A platen glass PG, which is an example of a transparent original-document table, is disposed on the upper surface of the scanner unit U2. In the scanner unit U2 according to the first exemplary embodiment, a reading unit U2*a*, which is an example of a reading portion, is disposed below the platen glass PG. The reading unit U2*a* according to the first exemplary embodiment is supported along the undersurface of the platen glass PG so as to be movable in the leftward and rightward directions, which are examples of a sub-scanning direction. Normally, the reading unit U2*a* is stationary at an initial position expressed by a solid line in FIG. 1. The reading unit U2*a* is electrically connected to an image processor GS.

In the auto-feeder U3 according to the first exemplary embodiment, a reading sensor U3*d*, which is an example of a second reading member, is disposed on the original-document transport path U3*a* at a position downstream, in the direction in which an original document is transported, of a portion that the reading unit U2*a* faces. The reading sensor U3*d* is capable of reading a surface of an original document Gi opposite to the surface of the original document Gi read by the reading unit U2*a*.

Figure 2:
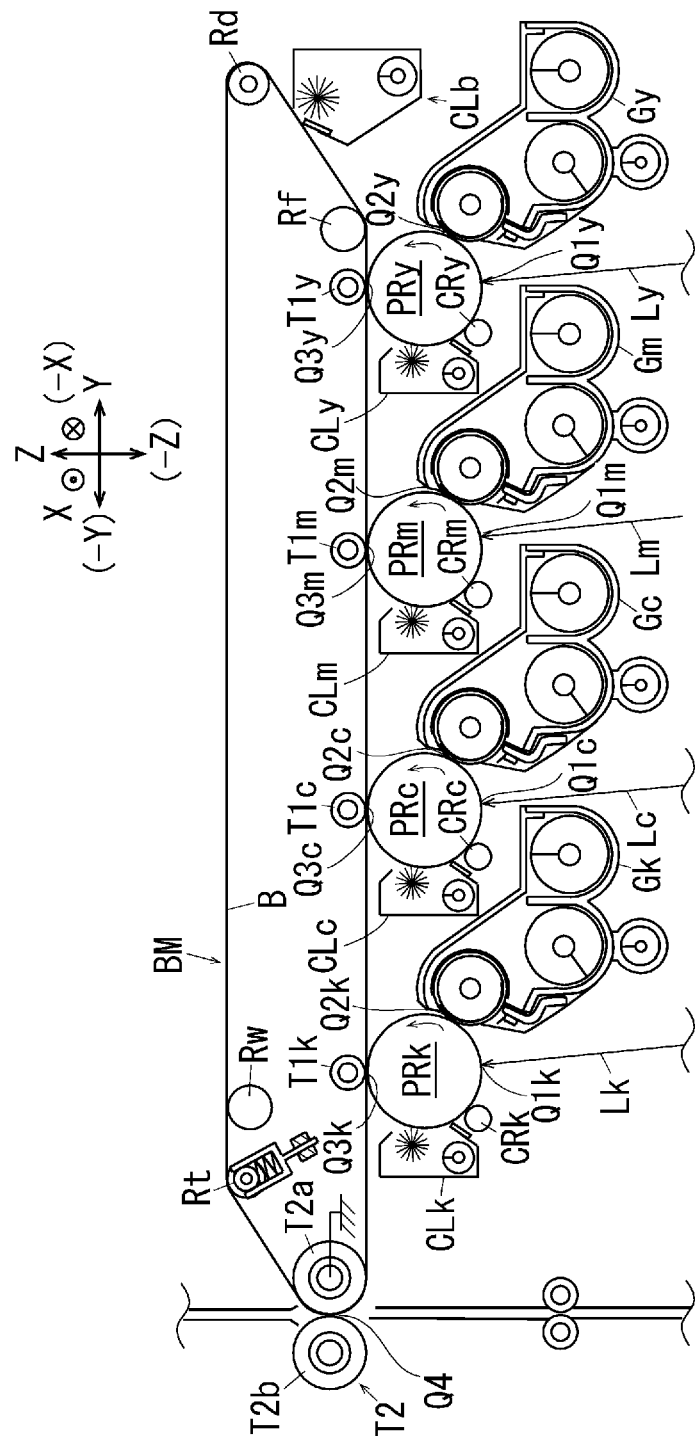
FIG. 2 illustrates a characteristic portion of an image recording unit according to the first exemplary embodiment.

FIG. 2 illustrates a characteristic portion of an image recording unit according to the first exemplary embodiment.

The image processor GS is electrically connected to a write circuit DL of the printer unit U1. The write circuit DL is electrically connected to an exposure device ROS, which is an example of a latent-image forming device.

The exposure device ROS according to the first exemplary embodiment is capable of emitting laser beams Ly, Lm, Lc, and Lk respectively corresponding to yellow (Y), magenta (M), cyan (C), and black (K) colors and serving as examples of write light beams. The exposure device ROS is capable of emitting laser beams Ly to Lk corresponding to signals input from the write circuit DL.

In FIG. 1, photoconductors PRy, PRm, PRc, and PRk, which are examples of image carriers, are disposed above the exposure device ROS. In FIG. 1 and FIG. 2, the areas of the photoconductors PRy to PRk irradiated with the corresponding laser beams Ly to Lk respectively constitute write areas Q1y, Q1m, Q1c, and Q1k.

Charging rollers CRy, CRm, CRc, and CRk, which are examples of charging devices, are disposed upstream of the corresponding write areas Q1y to Q1k in the direction in which the photoconductors PRy, PRm, PRc, and PRk rotate. The charging rollers CRy to CRk according to the first exemplary embodiment are supported so as to be allowed to rotate after coming into contact with the respective photoconductors PRy to PRk.

Developing devices Gy, Gm, Gc, and Gk are disposed downstream of the corresponding write areas Q1y to Q1k in the direction in which the photoconductors PRy to PRk rotate. The areas over which the photoconductors PRy to PRk face the corresponding developing devices Gy to Gk respectively constitute development areas Q2y, Q2m, Q2c, and Q2k.

First transfer rollers T1y, T1m, T1c, and T1k, which are examples of first transfer devices, are disposed downstream of the corresponding developing devices Gy to Gk in the direction in which the photoconductors PRy to PRk rotate. The areas over which the photoconductors PRy to PRk face the corresponding first transfer rollers T1y to T1k respectively constitute first transfer areas Q3y, Q3m, Q3c, and Q3k.

Photoconductor cleaners CLy, CLm, CLc, and CLk, which are examples of image carrier cleaners, are disposed downstream of the corresponding first transfer rollers T1y to T1k in the direction in which the photoconductors PRy to PRk rotate.

The Y-color photoconductor PRy, the charging roller CRy, the exposure device ROS that emits a laser beam Ly of the Y color, the developing device Gy, the first transfer roller T1y, and a photoconductor cleaner CLy constitute a Y-color image forming unit Uy, which is an example of a Y-color visible image forming device according to the first exemplary embodiment that forms a toner image. Similarly, each of the photoconductors PRm, PRc, and PRk, the corresponding one of the charging rollers CRm, CRc, and CRk, the exposure device ROS, the corresponding one of the developing devices Gm, Gc, and Gk, the corresponding one of the first transfer rollers T1m, T1c, and T1k, and the corresponding one of the photoconductor cleaners CLm, CLc, and CLk constitute a M-color, C-color, or K-color image forming unit Um, Uc, or Uk.

A belt module BM, which is an example of an intermediate transfer device, is disposed above the photoconductors PRy to PRk. The belt module BM includes an intermediate transfer belt B, which is an example of an intermediate transfer body. The intermediate transfer belt B is constituted of an endless member.

The intermediate transfer belt B according to the first exemplary embodiment is rotatably supported by a belt driving roller Rd, which is an example of a driving member, a tension roller Rt, which is an example of a tensioning member, a walking roller Rw, which is an example of a member that compensates for deviation, an idler roller Rf, which is an example of a driven member, a backup roller T2a, which is an example of a member facing a second transfer area, and the first transfer rollers T1y, T1m, T1c, and T1k.

A second transfer roller T2b, which is an example of a second transfer member, is disposed at such a position as to face the backup roller T2a with the intermediate transfer belt B interposed therebetween. In the first exemplary embodiment, the backup roller T2a is grounded. A power circuit E applies, to the second transfer roller T2b, a second transfer voltage having a polarity opposite to the polarity with which toner is electrically charged. The backup roller T2a and the second transfer roller T2b constitute a second transfer device T2 according to the first exemplary embodiment. The area over which the second transfer roller T2b comes into contact with the intermediate transfer belt B constitutes a second transfer area Q4.

A belt cleaner CLb, which is an example of a cleaner that cleans the intermediate transfer body, is disposed downstream of the second transfer area Q4 in the direction in which the intermediate transfer belt B rotates.

Components including the first transfer rollers T1y to T1k, the intermediate transfer belt B, and the second transfer device T2 constitute a transfer device according to the first exemplary embodiment. The image forming units Uy to Uk and the transfer device constitute an image recording unit according to the first exemplary embodiment.

In FIG. 1, three pairs of right and left guide rails GR, which are examples of guide members, are disposed at three different levels below the image forming units Uy to Uk. Each pair of guide rails GR support one of paper feed trays TR1 to TR3, which are examples of medium containers, in such a manner as to allow the paper feed tray to be insertable and removable frontward and rearward. The paper feed trays TR1 to TR3 hold recording sheets S, which are examples of media.

A pickup roller Rp, which is an example of a pickup member, is disposed at the upper left of each of the paper feed trays TR1 to TR3. Separation rollers Rs, which are examples of separation members, are disposed downstream of each pickup roller Rp in the direction in which a recording sheet S is transported. A paper feed path SH1, which extends upward and which is an example of a medium transport path, is formed downstream of the separation rollers Rs in the direction in which a recording sheet S is transported. Multiple transport rollers Ra, which are examples of transport members, are disposed on the paper feed path SH1.

Registration rollers Rr, which are examples of members that adjust timing of sheet transport, are disposed on the paper feed path SH1 at positions upstream of the second transfer area Q4.

A fixing device F is disposed downstream of the second transfer area Q4 in the direction in which a recording sheet S is transported. The fixing device F includes a heating roller Fh, which is an example of a member for fixing an image by heating, and a pressing roller Fp, which is an example of a member for fixing an image by pressing. The area over which the heating roller Fh and the pressing roller Fp come into contact with each other constitutes a fixing area Q5.

A paper ejection path SH2, which is an example of a transport path, is disposed above the fixing device F. A paper output tray TRh, which is an example of a medium output portion, is formed on the upper surface of the printer unit U1. The paper ejection path SH2 extends toward the paper output tray TRh. Ejection rollers Rh, which are examples of medium transport members, are disposed at a downstream end portion of the paper ejection path SH2.

Description of Image Forming Operation

When the copying machine U according to the first exemplary embodiment having the above-described configuration copies an original document Gi manually placed on the platen glass PG by an operator, the reading unit U2a moves leftward and rightward from the initial position to scan the original document Gi on the platen glass PG while reading unit U2a shines light to the original document Gi. When the copying machine U copies an original document Gi while automatically transporting the original document Gi using the auto-feeder U3, the reading unit U2a moves from the initial position to an original-document reading position, drawn with the broken line in FIG. 1, and stops at the original-document reading position. Multiple original documents Gi contained in the original-document tray TG1 are sequentially transported to the original-document reading position on the platen glass PG, pass through the original-document reading position, and are then ejected to the original-document output tray TG2. Thus, the original documents Gi that sequentially pass through the reading position on the platen glass PG are exposed to light and scanned by the reading unit U2a that remains stationary. The light reflected off the original documents Gi is received by the reading unit U2a. The reading unit U2a converts the received light that has been reflected off the original documents Gi into electric signals. In the case where both sides of an original document Gi are to be read, the reading sensor U3d also reads the original document Gi.

Electric signals output from the reading unit U2a are input to the image processor GS. The image processor GS converts electric signals of an image having read, green, and blue (RGB) colors read by the reading unit U2a into image data of yellow (Y), magenta (M), cyan (C), and black (K) for forming latent images. The image processor GS outputs the image data obtained after the conversion to the write circuit DL of the printer unit U1. In the case where the image is a single-color image or a monochromatic image, the image processor GS outputs image data of only black (K) to the write circuit DL.

The write circuit DL outputs control signals corresponding to the input image data to the exposure device ROS. The exposure device ROS outputs laser beams Ly to Lk corresponding to the control signals.

When an image forming operation is started, the photoconductors PRy to PRk are driven to rotate. The power circuit E applies charging voltages to the charging rollers CRy to CRk. Thus, the surfaces of the photoconductors PRy to PRk are electrically charged by the charging rollers CRy to CRk. In the write areas Q1y to Q1k, electrostatic latent images are formed by the laser beams Ly to Lk on the surfaces of the electrically charged photoconductors PRy to PRk. In the development areas Q2y to Q2k, the electrostatic latent images on the photoconductors PRy to PRk are developed by the developing devices Gy, Gm, Gc, and Gk into toner images, which are examples of visible images.

The toner images obtained after the development are transported to the first transfer areas Q3y, Q3m, Q3c, and Q3k in which the toner images touch the intermediate transfer belt B, which is an example of an intermediate transfer body. In the first transfer areas Q3y, Q3m, Q3c, and Q3k, the power circuit E applies first transfer voltages, having a polarity opposite to the polarity with which toner is electrically charged, to the first transfer rollers T1y to T1k. Thus, the toner images on the photoconductors PRy to PRk are transferred to the intermediate transfer belt B by the first transfer rollers T1y to T1k. In the case of forming a multi-color toner image, a toner image disposed downstream is transferred so as to be superposed on a toner image that has been transferred to the intermediate transfer belt B in an upstream first transfer area.

Remnants or adherents remaining on the photoconductors PRy to PRk after the first transfer are removed by the photoconductor cleaners CLy to CLk. The cleaned surfaces of the photoconductors PRy to PRk are recharged by the charging rollers CRy to CRk.

A single-color or multi-color toner image that has been transferred to the intermediate transfer belt B by the first transfer roller I1k or the first transfer rollers T1y to T1k in the first transfer area Q3k or the first transfer areas Q3y to Q3k is transported to the second transfer area Q4.

Recording sheets S on which images are to be recorded are picked up by the pickup roller Rp on a selected one of the paper feed trays TR1 to TR3. When multiple recording sheets S are collectively picked up by the pickup roller Rp, the recording sheets S are separated by the separation rollers Rs one from another. Each recording sheet S separated by the separation rollers Rs is transported along the paper feed path SH1 by the transport rollers Ra. The recording sheet S that has been transported along the paper feed path SH1 is fed to the registration rollers Rr.

The registration rollers Rr transport the recording sheet S to the second transfer area Q4 at the same time when the toner image formed on the intermediate transfer belt B is transported to the second transfer area Q4. The power circuit E applies a second transfer voltage, having a polarity opposite to the polarity with which toner is electrically charged, to the second transfer roller T2b. Thus, the toner image on the intermediate transfer belt B is transferred from the intermediate transfer belt B to the recording sheet S.

Adherents or other matter adhering to the surface of the intermediate transfer belt B after the second transfer are removed by the belt cleaner CLb.

When the recording sheet S to which the toner image has been second transferred passes through the fixing area Q5, the toner image is heated and fixed to the recording sheet S.

The recording sheet S to which the image has been fixed is transported along the paper ejection path SH2. The recording sheet S that has been transported along the paper ejection path SH2 is ejected to the paper output tray TRh by the ejection rollers Rh.

Description on Image Reading Apparatus

Figure 3:
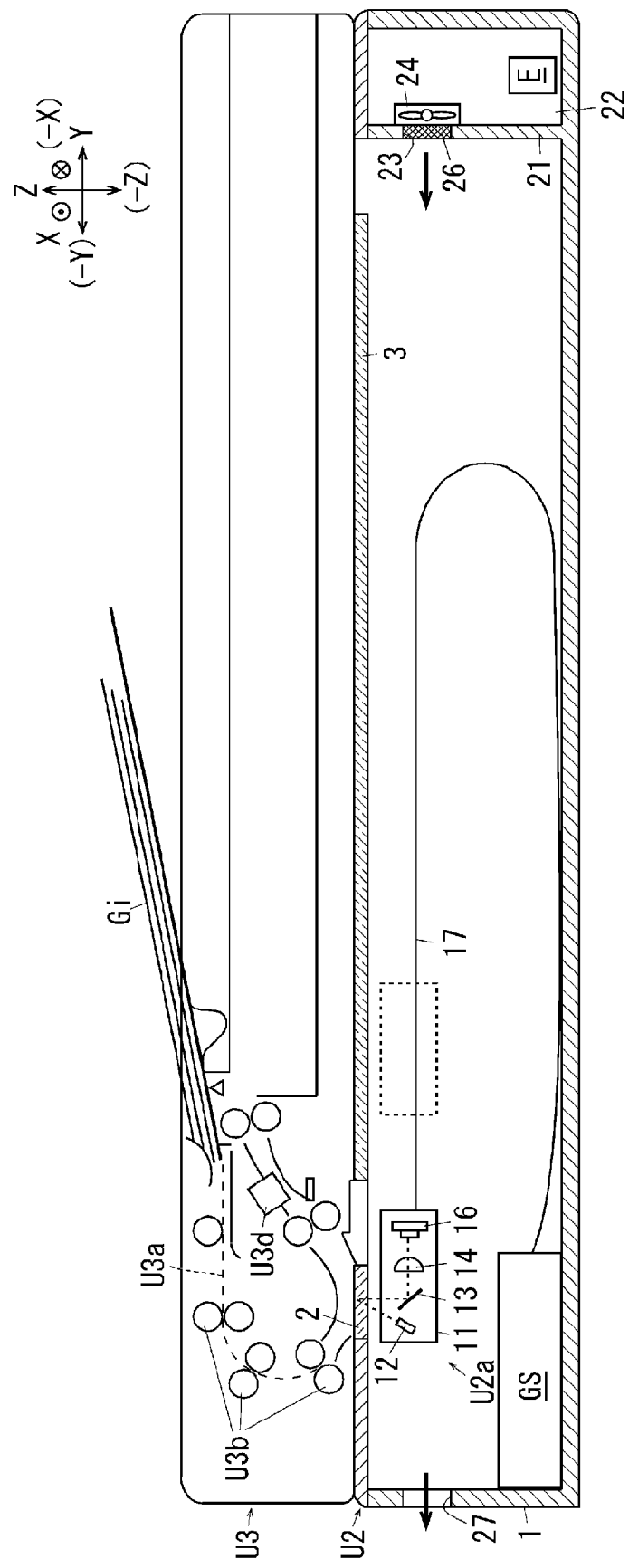
FIG. 3 illustrates an image reading apparatus according to the first exemplary embodiment.

FIG. 3 illustrates an image reading apparatus according to the first exemplary embodiment.

In FIG. 3, the scanner unit U2, which is an example of the image reading apparatus, includes a casing 1, which is an example of a housing. The platen glass PG, which is an example of a support table for original documents, is supported by the upper surface of the casing 1. The platen glass PG according to the first exemplary embodiment includes an automatic reading glass 2, disposed to the left, and a manual reading glass 3, disposed to the right.

In FIG. 1 and FIG. 3, the reading unit U2a is disposed below the platen glass PG.

The reading unit U2a according to the first exemplary embodiment includes a carriage 11, which is an example of a movable member. The carriage 11 is supported so as to be allowed to move rightward and leftward along the undersurface of the platen glass PG by a driving system, not illustrated. The carriage 11 supports an LED lamp 12, which is an example of a light source, a mirror 13 and a lens 14, which are examples of optical systems, and an image pickup device 16, which is an example of a reading member.

As illustrated in FIG. 3, the carriage 11 and the image processor GS, which is an example of a controller, are connected together using a flexible flat cable 17, which is an example of a connection member. Hereinbelow, the flexible flat cable is abbreviated to a "FFC".

Figure 4:
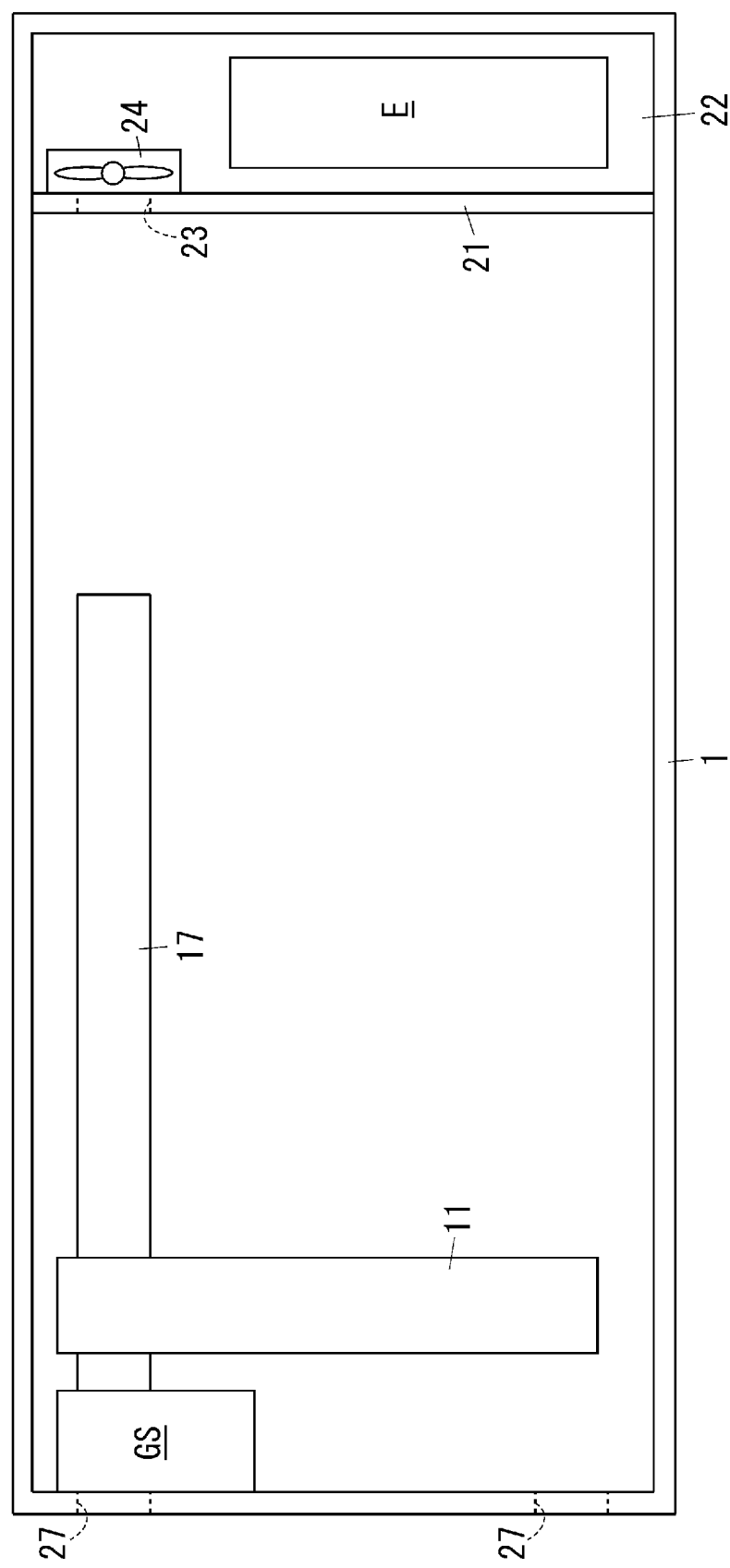
FIG. 4 is a plan view of a characteristic portion of the image reading apparatus according to the first exemplary embodiment.

In FIGS. 3 and 4, a FFC 17 according to the first exemplary embodiment has a strip shape whose longitudinal direction extends leftward and rightward and whose lateral direction extends frontward and backward. The FFC 17 has one end connected to the carriage 11 and the other end connected to the image processor GS. The FFC 17 according to the first exemplary embodiment is capable of supplying control signals or power to the LED lamp 12 or the image pickup device 16 in the carriage 11 or transmitting image data read by the image pickup device 16 to the image processor GS. The FFC 17 according to the first exemplary embodiment may be a commercially available FFC. Alternatively, the FFC 17 may be a particular FFC having one surface or both surfaces subjected to shielding as a measure against electromagnetic interference (EMI).

FIG. 4 is a plan view of a characteristic portion of the image reading apparatus according to the first exemplary embodiment.

In FIG. 3 and FIG. 4, a power housing 22, which is an example of a power source unit, is disposed on the right end of the casing 1 while being separated by a wall 21. The power housing 22 accommodates a power circuit E. The power circuit E according to the first exemplary embodiment feeds power to not only the scanner unit U2 but also other electric-powered components such as a motor and a sensor installed in the printer unit U1 and the auto-feeder U3 through harnesses or cables, which are examples of connection members. Thus, the casing 1 has one or more openings, not illustrated, through which harnesses or cables pass. This configuration thus allows air to flow into the casing 1 through the one or more openings, not illustrated. The casing 1 may also have an intake port through which air is taken in.

An opening 23, which connects the inside of the power housing 22 and the inside of the casing 1 to each other, is formed at a rear portion of the wall 21. A fan 24, which is an example of a sending member, is disposed at the opening 23. The fan 24 according to the first exemplary embodiment operates so as to send air in the power housing 22 to the casing 1.

A filter 26, which is an example of a removing member, is supported in the opening 23 according to the first exemplary embodiment. The filter 26 is constituted of an air filter that is capable of removing dust from the air.

A pair of front and rear air exits 27 are formed in the left end wall of the casing 1.

Function of Image Reading Apparatus According to First Exemplary Embodiment

When the copying machine U is turned on, the power circuit E starts operating in the scanner unit U2 according to the first exemplary embodiment having the above-described configuration. In the first exemplary embodiment, the fan 24 also starts operating at this time, so that air starts being sent from the power housing 22 to the casing 1. Air in the power housing 22 has been warmed by heat generated by the power circuit E and the air thus warmed is sent to the casing 1. Here, the air that is to be sent to the casing 1 has dust therein removed at the filter 26 and is thus purified.

Some image reading apparatuses have openings for allowing cables or harnesses to pass therethrough or for air intake. Such openings, however, also allow foreign matter or dust to enter the inside of the apparatuses, so that image reading errors may occur. In existing image reading apparatuses, an exterior cover is typically disposed on the outer side of the openings or the openings are typically sealed with a sealant such as a tape. Completely sealing the openings, however, is difficult in terms of, for example, the convenience of wiring of the harnesses. Moreover, completely sealing the openings causes other problems: the ventilation efficiency with which inside air is exchanged with the outside air lowers in a condensation environment, so that the length of time it takes from power-on or the standby state to the start of image reading increases. The technology for removing adhering dust or other matter, such as the technology described in Japanese Unexamined Patent Application Publication No. 10-243170, has not yet arrived at the thorough solution against the entry of foreign matter or dust. Moreover, the technologies described in Japanese Unexamined Patent Application Publication No. 10-243170 and Japanese Unexamined Patent Application Publication No. 9-197750 have been developed for merely introducing cool outside air and have not taken any measures against the condensation inside the reading device.

Recent years, LED lamps, having longer lives and consuming less power than other lamps such as halogen lamps, have been particularly increasingly used as light sources of image reading apparatuses. A LED lamp generates a smaller amount of heat than a halogen lamp. Thus, it is difficult to raise the temperature inside an image reading apparatus using heat generated by a LED lamp to remove condensation. Moreover, the image reading apparatus is spaced apart from the fixing device F of the printer unit U1, which produces a large amount of heat. Thus, it takes time until the temperature inside the image reading apparatus rises to such a degree as to remove condensation in the image reading apparatus using the heat from the fixing device F.

In the first exemplary embodiment, in contrast, the power housing 22 is disposed adjacent to the casing 1 and air warmed by the power circuit E is sent to the casing 1 using the fan 24. Then, as a result of receiving the warmed air thus sent thereto, the inside of the casing 1 has a positive pressure relative to the outside air. Thus, the outside air is less likely to flow in through the air exits 27. This configuration thus dispenses with sealing of the air exits 27. Thus, the air inside the casing 1 flows out through the air exits 27. The inside of the casing 1 thus allows air from which dust is removed by the filter 26 to flow thereinto, so that dust is less likely to adhere to components in the casing 1 such as the LED lamp 12 or the mirror 13. By introducing air warmed by the power circuit E into the casing 1, condensation is more quickly removed than in the case of the configuration in which outside air is introduced into the casing 1. Particularly, heat is more effectively used than in the case where waste heat is directly expelled to the outside air since the inside of the casing 1 of the scanner unit U2 is warmed by using waste heat generated to cool the power circuit E.

In addition, the air exits 27 are formed at the positions across from the opening 23 of the casing 1. Thus, the air flowing in through the opening 23 is more likely to spread over the entirety of the casing 1 than in the case where the air exits 27 are formed near the opening 23. Thus, this configuration facilitates warming of the entirety of the casing 1 and stabilizing the temperature.

MODIFICATION EXAMPLES

Thus far, an exemplary embodiment of the invention have been described in detail. However, the invention is not limited to the above-described exemplary embodiment and may be modified in various manners within the gist of the invention described in the scope of claims. The following exemplarily describes modification examples (H01) to (H05) of an exemplary embodiment of the invention.

H01

In the above-described exemplary embodiment, the copying machine U is described as an example of the image forming apparatus. However, the image forming apparatus is not limited to this example and may be a device such as a fax or a multifunctional machine having multiple functions such as the functions of a fax, a printer, and a copying machine. In addition, the image forming apparatus is not limited to an electrophotographic image forming apparatus and may be an image forming apparatus of another image forming type such as a photolithographic printer including an inkjet or thermal head printer. Moreover, the image forming apparatus is not limited to a multi-color developing image forming apparatus. The image forming apparatus may be a single-color or monochrome image forming apparatus. In the above-described exemplary embodiment, the scanner unit U2 has been exemplarily described as an example of an image reading device and the configuration where the scanner unit U2 is installed in the copying machine U has been exemplarily described. However, this is not the only configuration. An exemplary embodiment of the invention is also applicable to the configuration of a single body of a scanner.

H02

In the above-described exemplary embodiment, the configuration in which the power housing 22 is disposed on the right side of the casing 1 has been exemplarily described. However, this is not the only configuration. The power housing 22 may be disposed at other positions, such as on the left side, rear side, or lower side, in accordance with the design or other specifications. The positions of the opening 23 or the air exits 27 may also be changed accordingly.

H03

In the above-described exemplary embodiment, the configuration in which the filter 26 is disposed in the opening 23 has been exemplarily described. However, this is not the only configuration. The filter 26 and the fan 24 may be integrally formed or the filter 26 may be disposed in the casing 1 at a position on the inner side of the opening 23. Alternatively, if the power housing 22 has an intake port through which outside air is taken into the power housing 22, the filter 26 may be disposed at the intake port, whereby clean air is allowed to flow into the power housing 22 besides the inside of the casing 1.

H04

The exemplary embodiment has exemplarily described the configurations in which the light source, the optical system, and the reading member are all supported by the carriage 11. However, this is not the only possible configuration. For example, the light source and the optical system may be supported by the carriage 11 and the reading member may be fixedly supported by the casing 1.

H05

The exemplary embodiment has exemplarily described the configurations including the auto-feeder U3. The invention is also applicable to the configuration that does not include the auto-feeder U3.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. An image reading apparatus comprising:
   a housing unit including a support table on which an original document is supported;
   a reading member disposed inside the housing unit to read the original document;
   a power source unit disposed adjacent to the housing unit while being separated by at least one wall, the power source unit accommodating a power circuit; and
   a sending member that sends air inside the power source unit into the housing unit through an opening formed in the wall.
2. The image reading apparatus according to claim 1, further comprising a removing member disposed at the opening to remove dust.
3. An image forming apparatus, comprising:
   the image reading apparatus according to claim 1 that reads an image on an original document; and
   an image recording unit that records an image on a medium on the basis of the image read by the image reading apparatus.

* * * * *